(12) United States Patent
Blichmann

(10) Patent No.: US 7,192,187 B2
(45) Date of Patent: Mar. 20, 2007

(54) IN-LINE THERMOMETER

(76) Inventor: John R Blichmann, 809 S. 10th St., Lafayette, IN (US) 47905

( * ) Notice: Subject to any disclaimer, the term of this patent is extended or adjusted under 35 U.S.C. 154(b) by 0 days.

(21) Appl. No.: 10/819,026

(22) Filed: Apr. 6, 2004

(65) Prior Publication Data
US 2005/0002439 A1   Jan. 6, 2005

(51) Int. Cl.
G01K 1/14 (2006.01)
G01K 13/00 (2006.01)

(52) U.S. Cl. .............. 374/147; 374/162; 374/208; 374/141

(58) Field of Classification Search ........ 374/141, 374/120, 147, 148, 150, 155, 163, 170, 208, 374/162; 116/200, 206, 216
See application file for complete search history.

(56) References Cited

U.S. PATENT DOCUMENTS

| | | | | |
|---|---|---|---|---|
| 2,025,015 A * | 12/1935 | Byrns | ............ | 136/230 |
| 3,020,760 A * | 2/1962 | Schnoll | ........ | 73/204.25 |
| 3,291,670 A * | 12/1966 | Usab | ............ | 156/245 |
| 3,360,283 A * | 12/1967 | Guthrie | .......... | 285/110 |
| 3,696,677 A * | 10/1972 | Luedeman | ........ | 374/147 |
| 4,281,543 A * | 8/1981 | Raz | ................. | 374/147 |
| 4,297,668 A * | 10/1981 | Place | .............. | 337/365 |
| 4,510,343 A * | 4/1985 | Sivyer | ............ | 136/242 |
| 4,867,325 A * | 9/1989 | Dransfield | ......... | 215/11.2 |
| D317,876 S * | 7/1991 | Huen | ............... | D10/52 |
| D336,252 S * | 6/1993 | Klose | .............. | D10/52 |
| D356,045 S * | 3/1995 | Payne | ............. | D10/57 |
| 5,415,203 A * | 5/1995 | Huang | ........... | 138/104 |
| 5,454,641 A * | 10/1995 | Parker et al. | .......... | 374/120 |
| 5,601,493 A * | 2/1997 | Nakazono et al. | ...... | 464/181 |
| 5,651,695 A * | 7/1997 | Lee et al. | ............ | 439/495 |
| 5,791,698 A * | 8/1998 | Wartluft et al. | ......... | 285/328 |
| D399,436 S * | 10/1998 | Schwarz | ............ | D10/57 |
| 5,908,145 A * | 6/1999 | Jaksa | ............. | 222/394 |
| 5,927,763 A * | 7/1999 | Mehr | .............. | 285/305 |
| 5,975,587 A * | 11/1999 | Wood et al. | .......... | 285/15 |
| 5,980,102 A * | 11/1999 | Stulen et al. | ........... | 374/45 |
| 6,015,600 A * | 1/2000 | Greuel et al. | ......... | 428/34.9 |
| 6,112,580 A * | 9/2000 | Hesky | ............ | 73/49.1 |
| 6,202,284 B1 * | 3/2001 | Joblin | .............. | 29/516 |
| 6,410,896 B2 * | 6/2002 | Witonsky et al. | ....... | 219/689 |
| 6,427,260 B1 * | 8/2002 | Osborne-Kirby | ........ | 4/678 |
| 6,467,819 B2 * | 10/2002 | Seifert et al. | .......... | 285/341 |
| 6,485,175 B1 * | 11/2002 | Nimberger et al. | ..... | 374/142 |
| 6,540,265 B2 * | 4/2003 | Turk | ............. | 285/384 |
| 6,546,823 B1 * | 4/2003 | Veit | ............. | 73/866.5 |
| 6,568,279 B2 * | 5/2003 | Behm et al. | ........... | 73/756 |
| 6,579,006 B1 * | 6/2003 | Pariseau | ............ | 374/162 |
| 6,641,305 B2 * | 11/2003 | Wang | ............. | 374/148 |
| 6,742,815 B2 * | 6/2004 | McCurdy et al. | ....... | 285/276 |
| 6,779,919 B1 * | 8/2004 | Staniforth et al. | ...... | 374/147 |

(Continued)

Primary Examiner—Gail Verbitsky
(74) Attorney, Agent, or Firm—Larry Cain

(57) ABSTRACT

An improved temperature measuring device for the in-line temperature measurement of fluids which does not require intimate contact of the fluid with the temperature sensing element. In addition, the invention contains no internal cavities or crevices making it very advantageous for food and chemical usage. In the preferred embodiment, a liquid crystal temperature sensing element is affixed to a thermally conductive fluid carrying member. Each end of this fluid carrying member having fittings which enables the thermometer assembly to be quickly removed for cleaning and sanitizing.

10 Claims, 6 Drawing Sheets

U.S. PATENT DOCUMENTS

| | | | |
|---|---|---|---|
| 6,814,486 B2* | 11/2004 | Sidoni | 374/208 |
| 6,914,531 B1* | 7/2005 | Young | 340/606 |
| 7,124,452 B1* | 10/2006 | Bauza | 4/605 |
| 2001/0050278 A1* | 12/2001 | Chenault | 219/497 |
| 2001/0053172 A1* | 12/2001 | Sakowsky et al. | 374/147 |
| 2002/0017790 A1* | 2/2002 | Holmes et al. | 285/337 |
| 2002/0041621 A1* | 4/2002 | Faries et al. | 374/147 |
| 2002/0064206 A1* | 5/2002 | Gysling et al. | 374/147 |
| 2002/0191673 A1* | 12/2002 | Lee | 374/141 |
| 2004/0240520 A1* | 12/2004 | Faries et al. | 374/162 |

\* cited by examiner

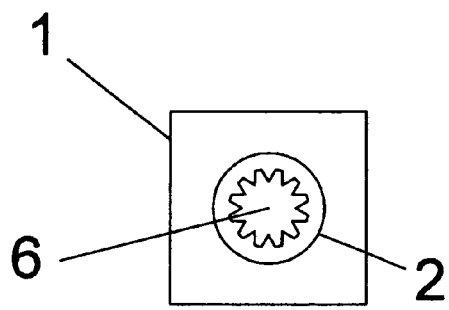
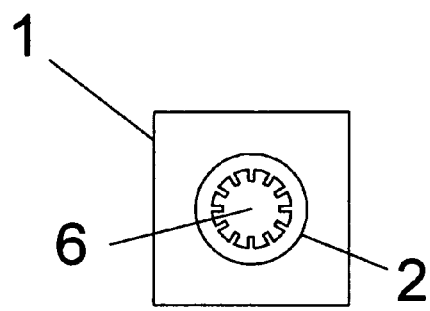
Fig. 5a　　　　　　　　Fig. 5b
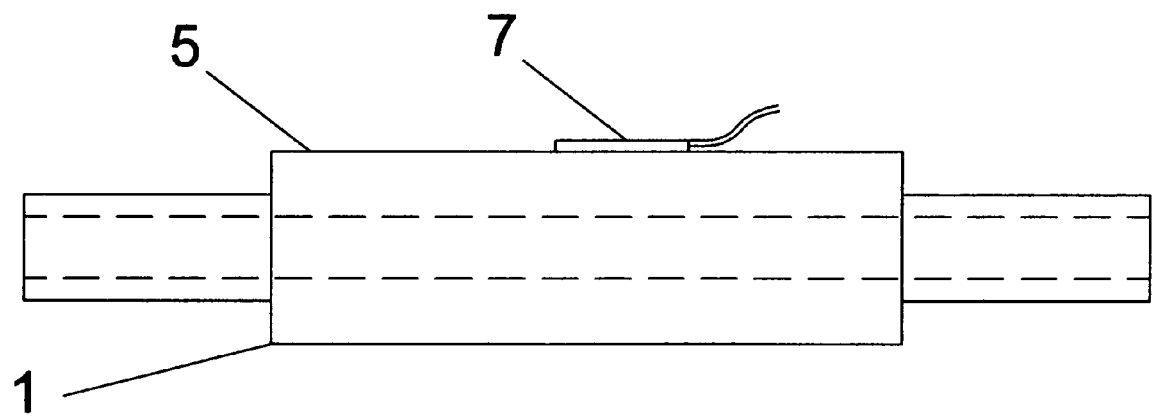
Fig. 6

IN-LINE THERMOMETER

BACKGROUND

1. Field of the Invention

This invention relates generally to temperature measurement devices, specifically to in-line thermometers for fluid temperature measurement.

2. Discussion of Prior Art

It is well known in the art to utilize various types of thermometers for measuring fluid temperatures. Such thermometers are typically mercury or alcohol bulb type, bi-metal type, thermocouple, RTD etc. All aforementioned thermometers require the temperature sensing element to be in intimate contact with the fluid or in thermal communication through a "well". As a result, numerous fittings must be assembled or welded into the fluid carrying plumbing to accommodate this need. These fittings are not only costly to assemble and procure, they are prone to leaks and unsanitary and corrosive conditions in food, pharmaceutical, petrochemical, and similar applications. These leaks can be dangerous and unhealthy. In cases where portability of the instrument is important, these type thermometers are difficult and time consuming to remove and plug the vacated holes. It is also well known in the art to install a surface type thermometer to the fluid carrying member such as a liquid crystal thermometer or surface type RTD or thermocouple. Such examples are prior art U.S. Pat. No. 5,415,203 by Huang and U.S. Pat. No. 5,634,426 by Tomlinson, where a liquid crystal thermometer is applied directly to the fluid carrying member, a pipe. In the case of the liquid crystal thermometer, it is not practical to remove it after the temperature reading is made without permanently damaging the unit due to the adhesive used to apply the thermometer. As such, portability and re-use is impossible. In the case of surface type RTD's or thermocouples, installation requires the application of messy adhesives, thermal coupling fluids and tapes. In addition, a remote read-out device must be used to take the measurement. Although cumbersome, the elements can typically be reused.

OBJECTS AND ADVANTAGES

Accordingly, it is an object of this invention to provide a thermometer that does not require intimate contact with the fluid.

It is an object of this invention to provide a thermometer that does not require numerous fittings or welding to install.

Yet another object of this invention is to provide a thermometer that can easily be removed from the fluid carrying member and re-used.

Yet another object of this invention is to provide a sanitary and corrosion resistant thermometer free of interstitial cavities where bacteria or corrosive chemicals can lodge.

A final object of this invention is to provide a thermometer that can be removed for easy sterilization, or decontamination from chemical usage.

DESCRIPTION OF DRAWINGS

FIG. 5a and FIG. 5b show different embodiments of the internal fluid passage in the invention. FIG. 6 shows the invention with a surface type thermometer applied to a face of the invention.

DESCRIPTION OF THE PREFERRED EMBODIMENT

Figure 1A:
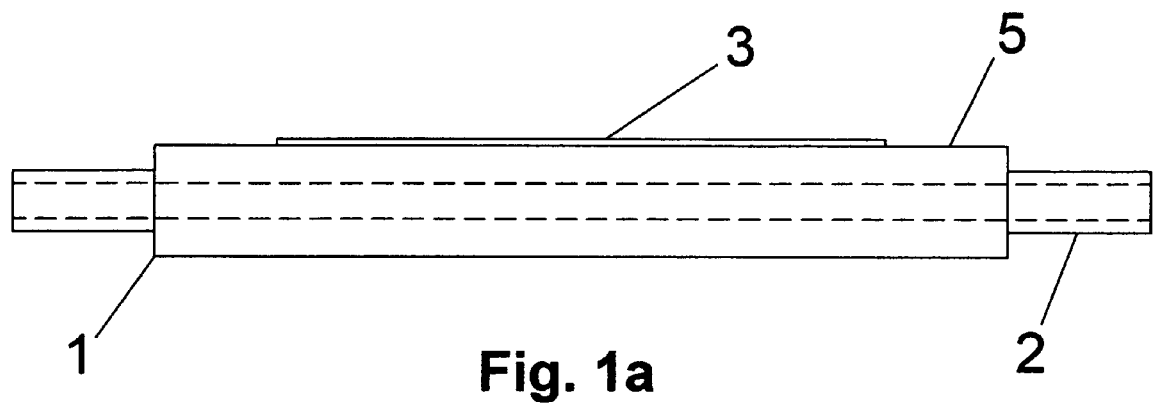
FIG. 1a and FIG. 1b show front and end views respectively of the invention.
Figure 1B:
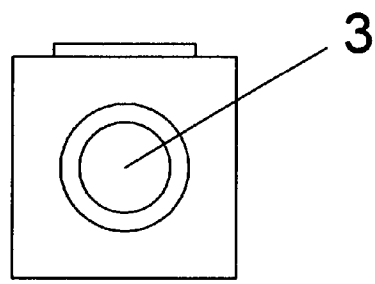

Referring to the drawings, and particularly FIGS. 1a and 1b, the in-line thermometer comprises a thermally conductive tube 1 having at least one surface 5 to mount at least one liquid crystal thermometer display element 3 to detect and display the temperature of a fluid passing through fluid passage 6 without the passing fluid directly contacting temperature display element 3. At each end of tube 1 are fittings 2 to allow mounting of a hose, pipe, tube or other fluid carrying device, used to transfer fluid through fluid passage 6.

Fluid passage 6 is preferably round to facilitate cleaning, but can be of any shape such as those serrated shapes shown in FIGS. 6a–b. FIG. 6a, which have increased surface area therefore more readily transfers heat from the fluid to the tube resulting in a more responsive accurate measurement. Similarly, tube 1 can be of various shapes as shown in FIGS. 3a–3e. Referring to FIGS. 4a to 4d show an alternate embodiment where the fittings 2 are of different configurations of a sampling of commonly available fluid connections. FIGS. 4e to 4h show an alternate embodiment where the end fittings 2 are individual pieces installed by threaded, pressed, welded or other equivalent assembly means.

Figure 2A:
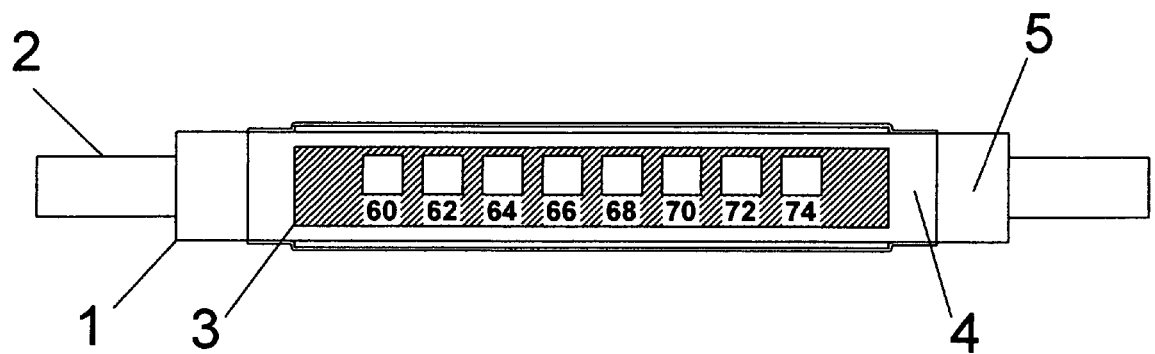
FIG. 2a and FIG. 2b show front and end views respectively of the invention with a plurality of liquid crystal thermometers applied to more than one face and with a protective film applied over the thermometers for protection from liquids.

In the preferred embodiment shown in FIG. 2a the liquid crystal display 3 is an array of elements, each sensing a different temperature with the indicated temperature reference printed adjacent to the temperature indicators. Also in the preferred embodiment, shown in FIG. 2b, a liquid crystal temperature element 3, each of a different temperature range, is placed on more than one side of tube 1 to further expand the range of temperatures sensed by the in-line thermometer.

Figure 2B:
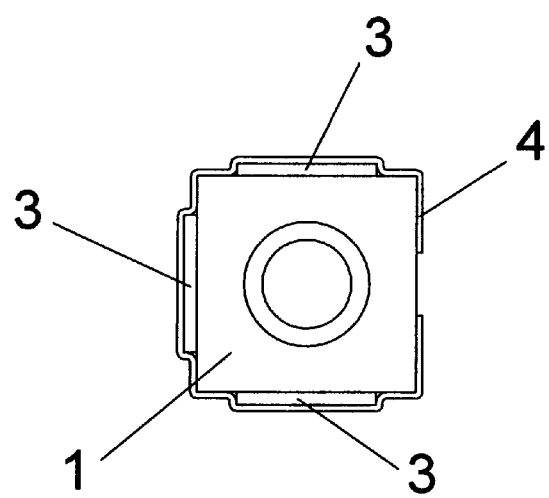
Figure 3A:
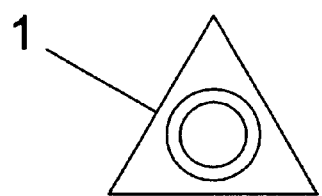
FIGS. 3a–3e show different embodiments of the invention's cross-section.
Figure 3B:
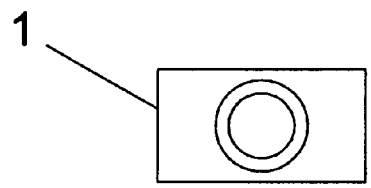
Figure 3C:
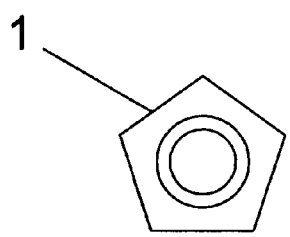
Figure 3D:
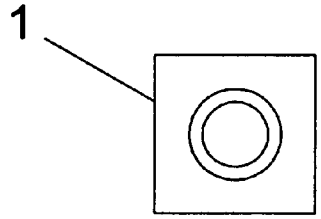
Figure 3E:
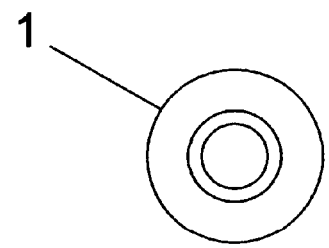
Figure 4A:
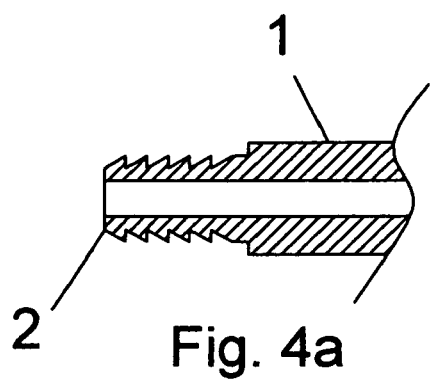
FIGS. 4a–4h show different embodiments of the end connections of the invention. Additional embodiments shown in FIGS. 4a–4d have the fitting formed integral with the tube.
Figure 4B:
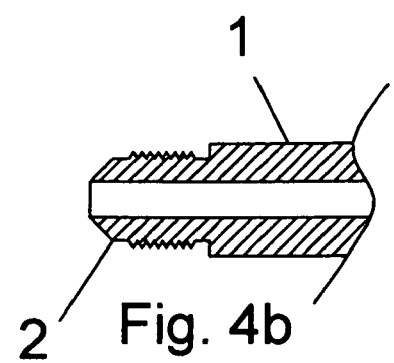
Figure 4C:
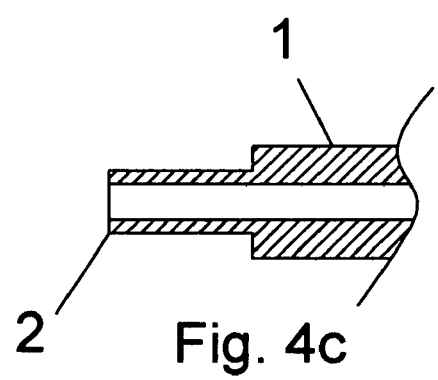
Figure 4D:
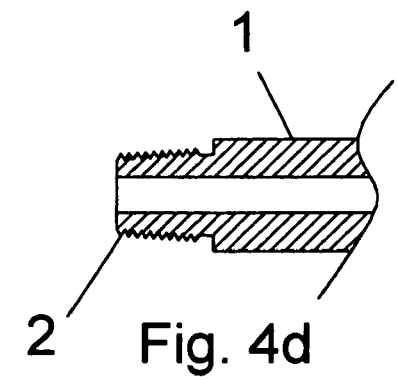
Figure 4E:
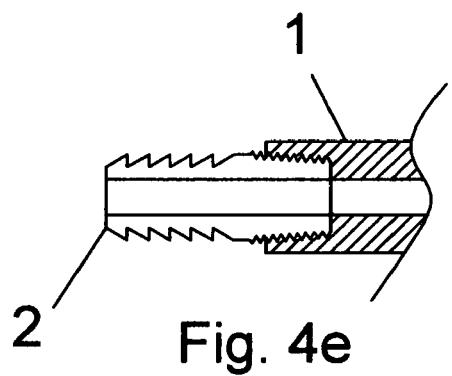
Figure 4F:
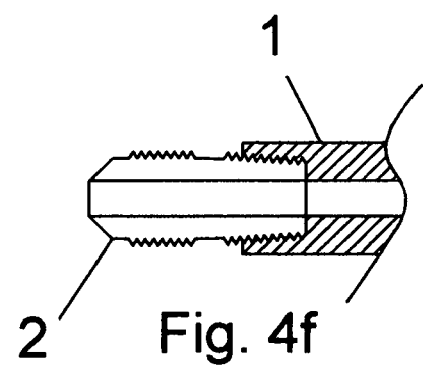
Figure 4G:
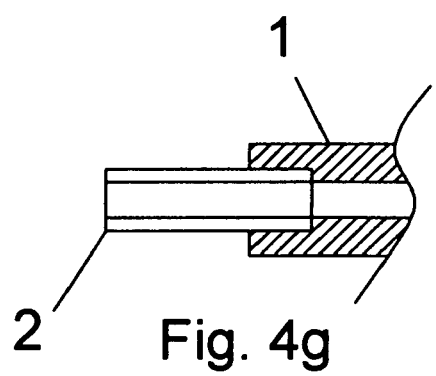
Figure 4H:
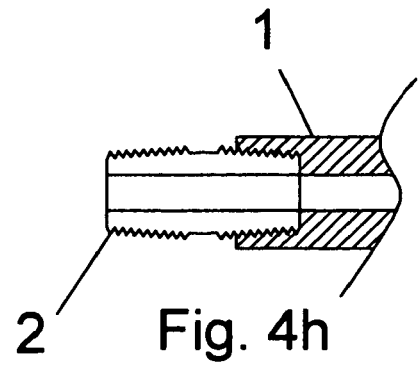

Referring to FIG. 2a and FIG. 2b, another embodiment of the invention includes a film 4 to cover the liquid crystal thermometer elements 3 to protect it from moisture or damage.

Another embodiment of the invention, shown in FIG. 6, utilizes a surface type temperature probe 7 to provide a temperature reading of surface 5.

Figure 7A:
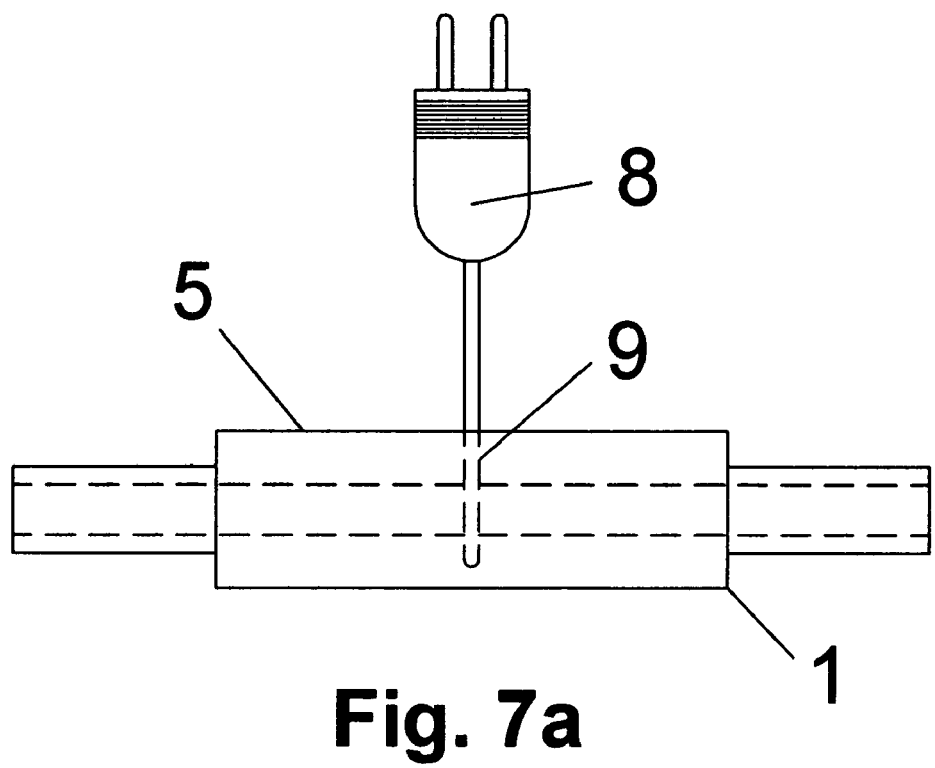
FIGS. 7a and 7b show front and end views respectively of the invention where a temperature probe is inserted into a hole in the invention.
Figure 7B:
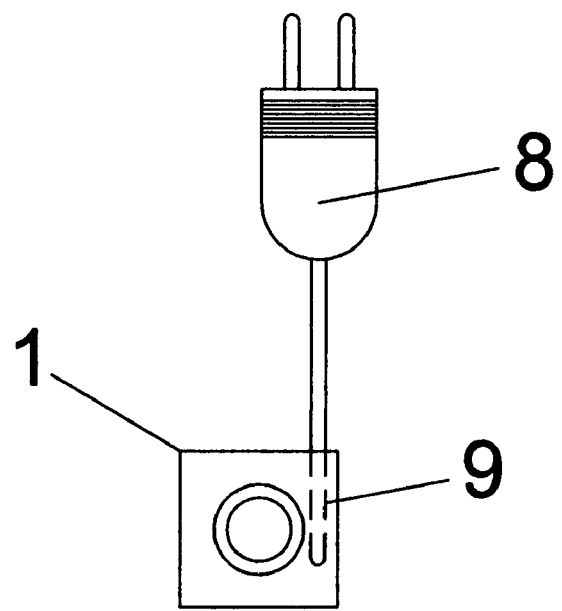

FIG. 7a and FIG. 7b show yet another embodiment of the invention where a temperature probe 8 is placed into hole 9 to measure the internal temperature of thermally conductive tube 1.

Operation of the Preferred Embodiment

Referring to FIG. 1, the in-line thermometer is placed in series or parallel flow with a fluid carrying tube, hose, pipe or other similar fluid carrying medium by connecting it to one or both ends of the in-line thermometer utilizing the appropriate fittings 2. As fluid passes through tube 1 it transfers heat to or from the wall of the tube, which in turn transfers heat to or from the liquid crystal thermometer element 3 causing a color change in the element indicating the internal fluid temperature. As the fluid temperature changes, heat will again be transferred to or from the fluid and to or from the liquid crystal sensing elements until equilibrium point is again reached.

In order to provide a responsive, accurate thermometer, tube 1 should be constructed with the least amount of material as possible for the pressure and flow capacity required for the application. In addition, the liquid crystal sensing elements 3 should be placed as close to fluid passage 6 as possible to minimize conductive and convective losses. Finally, tube 1 should be constructed of the most thermally conductive material appropriate for the fluid being carried.

To clean, calibrate, repair or inspect the thermometer, simply disconnect the fittings 2 from the fluid carrying media. Since there are no interstitial cavities on the surfaces that carry the fluid, sanitizing fluids and chemical wash fluids are not inhibited from thoroughly cleaning and decontaminating fluid passage 6.

Operation of the alternate embodiment shown in FIG. 6 is identical to that of the preferred embodiment except that liquid crystal thermometer element 3 (shown in FIG. 1*a*) is replaced by a surface type temperature probe 7 to provide a temperature reading of surface 5.

Operation of yet another alternate embodiment, shown in FIG. 8, is identical to that of the preferred embodiment except that the liquid crystal thermometer element 3 (shown in FIG. 1*a*) is replaced by a temperature probe 8 which is placed into hole 9 to measure the internal temperature of thermally conductive tube 1.

SUMMARY, RAMIFICATIONS, AND SCOPE

Thus the reader will see that the in-line thermometer provides a highly reliable corrosion and contamination resistant thermometer that is easy to install, remove, sterilize and decontaminate. While my description contains many specificities, these should not be construed as limitations of the scope of the invention, but rather as an exemplification of one preferred embodiment thereof. Many other variations are possible such as innumerable profile shapes, materials, fittings and temperature sensing devices. Accordingly, the scope of the invention should be determined not by the embodiments illustrated, but by the appended claims and their legal equivalents.

I claim:

1. A food, pharmaceutical or petrochemical fluid temperature measuring device comprising:
   a. a single piece fluid carrying member has an outer profile having a plurality of outside surfaces being generally flat and being constructed of a thermally conductive material, and having an at least one fluid inlet and an at least one fluid outlet,
   b. a first fitting means being positioned on said at least one fluid inlet and a second fitting means being positioned on said at least one fluid outlet and being included as a part of said single piece fluid carrying member, said first and second fitting means having smooth circular outer profiles for connecting to other food, pharmaceutical or petrochemical fluid carrying members, said circular outer profiles of said fitting means are being smaller than said outer profile of said single piece fluid carrying member; the outer profile of the first fitting and the outer profile of the second fitting are made of equal diameters;
   c. said single piece fluid carrying member has a smooth sanitary and corrosive resistant internal surface making a fluid passage extending between said at least one fluid inlet and said at least one fluid outlet free and void of interstitial cavities, and an internal passage within each fitting means forming an extension of said fluid passage; internal surfaces of said first and second fitting means are made of equal diameters and having smooth sanitary and corrosive resistant internal surfaces making said internal passage within each fitting means free and void of interstitial cavities, and an interface between said fluid passage and said internal passage being smooth and free and void or interstitial cavities, and at least one liquid crystal temperature sensing element applied to said at least one of said plurality of outside surfaces being flat of said single piece fluid carrying member and being in temperature sensing relationship to said fluid passage;

wherein said single piece fluid carrying member has an inner circular profile whose inner diameter is made equal to said inner diameter of said fitting means; and wherein said fluid temperature measuring device is removable.

2. The fittings means of claim 1 wherein said circular outer profile of said fitting means having a straight configuration.

3. The temperature measuring device of claim 1 wherein said temperature measuring device is adapted to have a food, pharmaceutical and petrochemical fluid transferred within said fluid passage between said at least one fluid inlet and said at least one fluid outlet and said temperature measuring device is adapted to be removably attached to said other food, pharmaceutical and petrochemical fluid carrying members.

4. The fluid carrying passage of claim 1 wherein said fluid passage and said internal passage having a round configuration.

5. The single piece fluid carrying member of claim 1 wherein said outer profile of said single piece fluid carrying member having a generally rectangular configuration.

6. The single piece fluid carrying member of claim 1 wherein said outer profile of said single piece fluid carrying member having a generally triangular configuration.

7. The single piece fluid carrying member of claim 1 wherein said outer profile of said single piece fluid carrying member having a generally hexagonal configuration.

8. The fluid temperature measuring device of claim 1 wherein said liquid crystal temperature sensing elements are a plurality of elements.

9. The fluid temperature measuring device of claim 1 wherein said liquid crystal temperature sensing elements are affixed to at least two of said plurality of sides of said single piece fluid carrying member.

10. The fluid temperature measuring device of claim 1 wherein said liquid crystal temperature sensing element is covered by a film.

* * * * *